United States Patent [19]

Pye et al.

[11] Patent Number: 5,337,061

[45] Date of Patent: Aug. 9, 1994

[54] HIGH PERFORMANCE ANTENNA FOR HAND-HELD AND PORTABLE EQUIPMENT

[75] Inventors: Michael R. Pye, Winchester; Stephen A. Williams, Southampton, both of England

[73] Assignee: Shaye Communications Limited, Winchester, England

[21] Appl. No.: 833,923

[22] Filed: Feb. 12, 1992

[30] Foreign Application Priority Data

Feb. 12, 1991 [GB] United Kingdom ............... 9102935

[51] Int. Cl.⁵ .................................................. H01Q 1/24
[52] U.S. Cl. .................................. 343/702; 343/749; 455/89
[58] Field of Search ........ 343/702, 749, 745, 700 MS; 455/89, 90, 128, 347, 351; H01Q 7/24

[56] References Cited

U.S. PATENT DOCUMENTS

| | | | |
|---|---|---|---|
| 4,123,756 | 10/1978 | Nagata et al. | 343/702 |
| 4,571,595 | 2/1986 | Phillips et al. | 343/702 |
| 4,644,366 | 2/1987 | Scholz | 343/702 |
| 4,827,266 | 5/1989 | Sato et al. | 343/700 MS |
| 4,849,765 | 7/1989 | Marko | 343/700 MS |
| 4,992,799 | 2/1991 | Garay | 343/702 |
| 5,148,181 | 9/1992 | Yokoyama | 343/700 MS |
| 5,184,143 | 2/1993 | Marko | 343/702 |

Primary Examiner—Donald Hajec
Assistant Examiner—Tan Ho
Attorney, Agent, or Firm—Wenderoth, Lind & Ponack

[57] ABSTRACT

An antenna system for portable electronic apparatus, particularly for the handset of a cordless telephone system, and comprising two antenna, a first (shown) mounted on a flap (2) and comprising a groundplane 5 and active monopole 4 fed by a coaxial feed 6 from electronic circuitry (not shown) in the main section of the handset 1. The flap is pivotally connected to the main section of the housing 1, and is folded down against the main section when not in use. Another similar antenna is fitted in the main section, and both antennae are connected to the transceiver circuitry via the same node. The two antennae are specially designed so as to introduce deliberate mismatch so as to provide an effective switching system between the two antenna without the need for separate circuit elements.

12 Claims, 2 Drawing Sheets

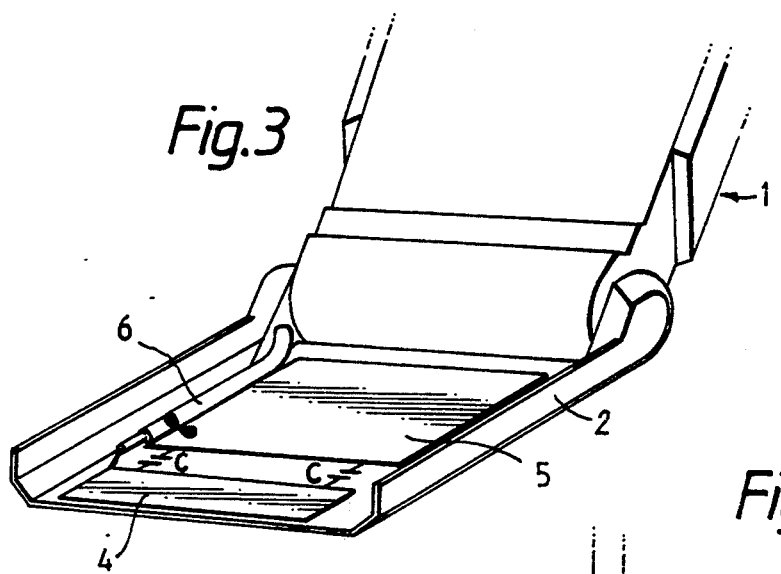
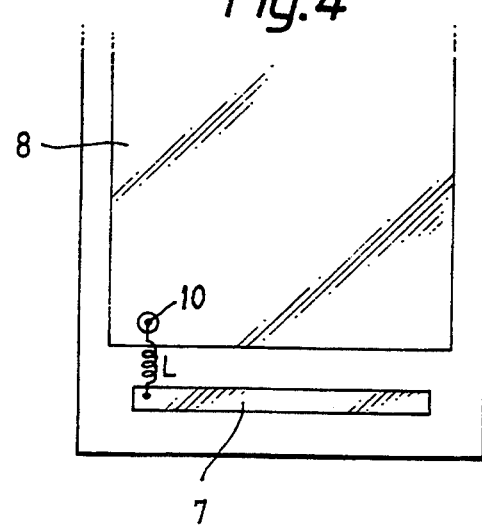
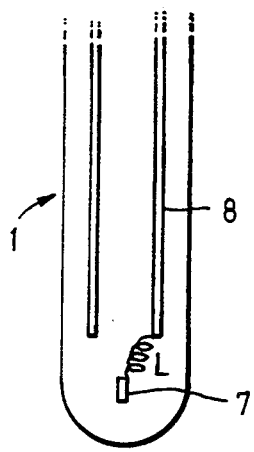
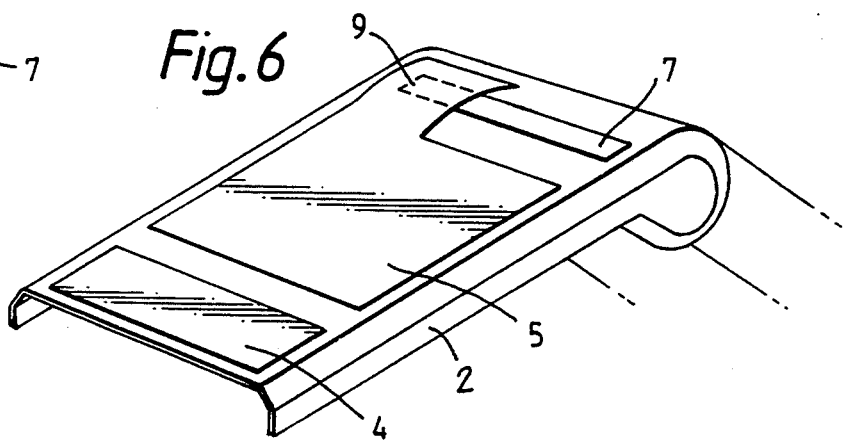

HIGH PERFORMANCE ANTENNA FOR HAND-HELD AND PORTABLE EQUIPMENT

BACKGROUND OF THE INVENTION

This invention relates to antennae and in particular to high-performance antennae for use in hand-held and similar portable equipment such as hand-held radio telephones.

The specific application of this invention is in a CT2 digital cordless telephone operating at 864–868 MHz. The style of the phone is a small handset, with a hinged flap which opens to reveal a keypad. When the handset is not in use, the flap is closed to reduce the phone size and conceal the keypad.

FIGS. 1 and 2 of the accompanying drawings show a typical handset, one or more of which may be potentially in communication with a base unit (not shown) incorporating a transceiver, together with interface circuitry for connection to an associated telephone network. The handset electronics, including a transceiver and associated antenna for communicating with the base unit, is contained within a housing 1 of plastic material. A hinged flap 2, shown in the open position in FIG. 2, allows access to a keypad 3.

In such a system, it is clear that radio performance will be inherently degraded by placing the handset against an obstacle. In the case of a telephone, the handset is always against the users head when the phone is in use. This causes attenuation which is especially apparent at high frequencies, such as those of cellular and CT2 systems. It is possible to add an external antenna to the handset to reduce the effect by moving the antenna a small distance away from the head. This invention specifically provides an antenna system within the body of the handset, providing improved performance without the need for an external antenna. It also efficiently provides antenna switching without the need for any additional components.

SUMMARY OF THE INVENTION

In accordance with a first aspect of the invention, portable electronic apparatus has a housing made, at least in part, of insulating material, and incorporating an antenna comprising radiating element and a ground plane, said radiating element comprising a length of conductive material disposed parallel to the ground plane and fed from one end.

In accordance with a second aspect of the invention, a portable electronic apparatus comprises a housing formed in two sections which are movable with respect to one another, said housing containing electronic circuitry including an antenna system, said antenna system comprising a first antenna mounted on one of said sections and a second antenna mounted on the other of said sections, and wherein said first and second antennae are connected to said electronic circuitry via the same node.

BRIEF DESCRIPTION OF THE DRAWINGS

In order that the invention may be better understood, an embodiment thereof will now be described by way of example only and with reference to the accompanying drawings in which:

FIG. 3 is a diagrammatic perspective view showing a first embodiment of the antenna of the present invention, built into the flap of the handset illustrated in FIGS. 1 and 2;

FIGS. 4 and 5 are partial front and side edge views respectively of the handset housing, showing diagrammatically a second antenna; and FIG. 6 is a diagrammatic perspective view showing an alternative embodiment of the flap antenna.

DESCRIPTION OF THE PREFERRED EMBODIMENTS

Figure 1:
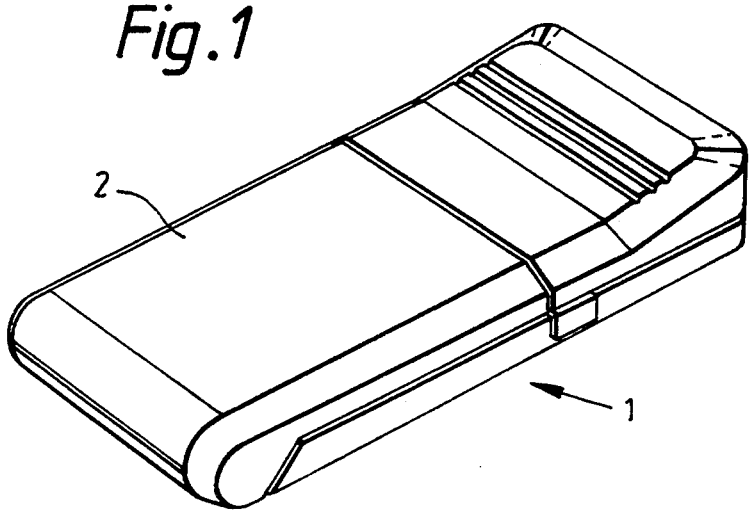
FIGS. 1 and 2 are perspective views of a telephone handset typical of the type of apparatus with which the present invention is concerned.
Figure 2:
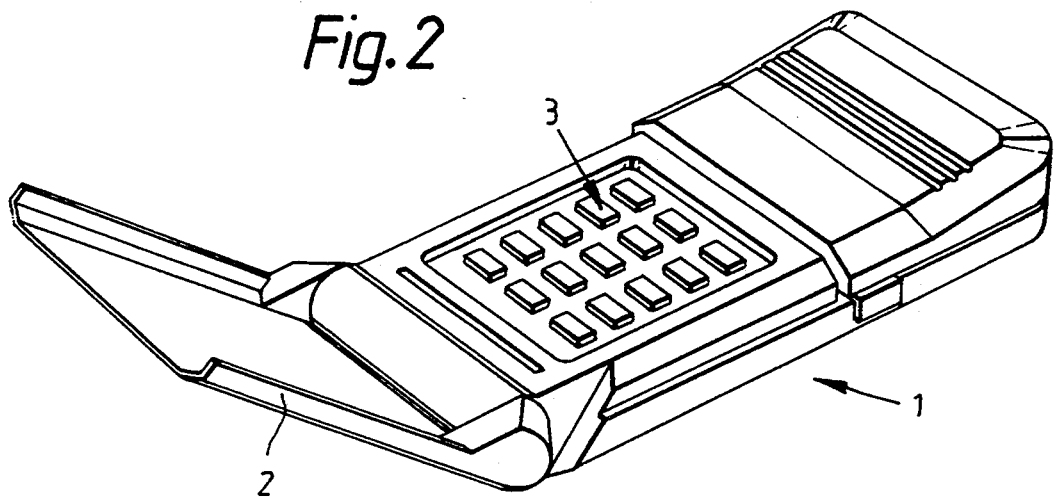

FIGS. 3 to 5 show a first embodiment of the invention in which a pair of antennae, fed from a common node in the transceiver circuitry, are mounted respectively on the flap 2 (FIG. 3) and in the housing 1 (FIGS. 4 and 5).

In order to reduce the effect of placing the handset against the head, the main antenna is built into the end of the flap 2. The antenna is planar in construction and, in the embodiment illustrated, comprises a monopole 4 over a ground plane 5, fed by a coaxial feed 6 from the handset transceiver circuitry. The active element 4 is laid parallel to the ground plane 5 due to space constraints, which differs from a standard monopole which is positioned perpendicular to the ground plane. The antenna looks inductive and so is capacitively matched by means of capacitors C. Now with the phone in use, the flap 2 is located away from the head and this is enough to greatly reduce the adverse proximity effects. Antenna performance comparable with an external antenna is achieved.

A drawback of the flap antenna is apparent when the flap is closed (when the phone is not in use). In this position the rest of the transceiver circuitry is situated over the antenna, providing a very effective screen from any incoming signals. The antenna performance is thus unacceptably degraded.

To overcome this problem, an embodiment of the invention provides that a second antenna is built into one end of the main body of the handset (the bottom, in this case). The internal antenna design used in the example illustrated is similar to the flap antenna 4/5, and is shown in FIGS. 4 and 5. A copper strip 7 is laid at the bottom of the handset, parallel to the ground plane 8 provided by the internal circuit boards. The length of the strip 7 is approximately a ¼ wavelength, and is tuned with series inductance L. The second antenna is fed from the electronic circuitry via a terminal 10, which connects to one end of inductance L. The other end of inductance L connects to one end of the strip 7. This internal antenna performs much better than the flap antenna when the flap is closed. However, the reverse is true when the phone is in use against the head. The close proximity of the head, and also the tendency of the user to hold the end of the phone both cause power to be absorbed.

To obtain optimum performance, the antennae are joined at a common node and switched on and off depending on the status of the phone. With the phone in use, only the flap antenna is selected, while with the flap shut, only the internal antenna is used.

Antenna switching may be realized in several ways. Most involve extra circuitry (more space) and current (shorter battery life). Both of these are at a premium in a hand-held product. This invention realizes antenna switching with no extra components: it relies on the careful design of the antenna impedances.

The flap antenna 4/5 is designed to have a good match to the connecting handset circuitry so that all the power is transferred when the flap 2 is open and the phone is in use. When the flap is closed, the proximity of the rest of the handset circuitry causes additional capacitance between the flap antenna active element 4 and the ground plane 5. This causes the antenna to be detuned, the effect of which is to change the antenna impedance to a bad mismatch at the required frequency. This in turn causes most of the power to be reflected back from the antenna. This means that the antenna is electrically switched off but without any need for switching components.

The antenna mismatch has been carefully designed so that the flap antenna appears to be an open circuit when the flap is closed. This is realized by connecting the flap antenna to the handset with a length of 50 ohm line which transforms the arbitrarily mismatched antenna to an open circuit. This allows a second, well matched antenna to be connected at the same node without experiencing any interference from the (turned-off) flap antenna. Thus when the flap is closed, all the power is diverted to this second antenna, which is the internal antenna 7/8.

However, with the internal and flap antennae connected to the same node, there is a problem when the phone is in use. Now the flap antenna 4/5 and the internal antenna 7/8 both look like a good match for the handset circuitry, so half the power is split between each of the internal and flap antennae. As the internal antenna performs badly next to the head, putting half the power into it can be considered wasted power relative to the flap antenna. The flap antenna is also operating at half power, so this has been degraded. To realize good phone performance when the flap is open, the internal antenna must be turned off. Without the need for switching circuits, this can be realized in two ways.

The first way is to introduce a deliberate impedance mismatch between the internal and flap antennae. For example, the internal antenna impedance may be made significantly higher than that of the flap antenna. When the flap 2 is open, the power delivered to the flap antenna is greater than that in the internal antenna by a ratio equal to the inverse of the relative antenna impedances. When the flap is closed, the flap antenna is open circuit, so there is only power delivered to the internal antenna. Due to the mismatch, there is a slight loss of internal antenna efficiency. In an example, the internal antenna impedance is raised to a typical value of double that of the matched flap antenna. When the flap is closed, the flap antenna still appears open circuit, and the 2:1 mismatch between the handset and the internal antenna causes an acceptable loss. When the flap is open, the 1:2 impedance ratio causes twice as much power to flow in the flap antenna as in the internal antenna. This restores the flap antenna performance to an acceptable level, while reducing the contribution from the redundant internal antenna.

The second way is to introduce a mechanical tuning element to the internal antenna (see FIG. 6). The element is extra ground plane 9 placed near the internal antenna at the bottom of the flap. As for the flap antenna, when the flap is opened, this element moves so that the relative capacitance between the internal antenna and the flap changes, causing a detuning effect. This mismatch causes less power to be radiated in the internal antenna, increasing the effectiveness of the flap antenna.

We claim:

1. A portable electronic apparatus having a housing made, at least in part, of insulating material, and incorporating an antenna comprising an active element and a ground plane, said active element comprising a length of conductive material disposed parallel to the ground plane and fed from one end; wherein the antenna is mounted on a sheet of insulating material forming part of said housing, and comprises a first rectangular sheet of conductive material forming said ground plane, and a second, elongate, rectangular sheet of conductive material forming said active element; and wherein the housing is in two sections which are movable with respect to one another, and wherein said sheet of insulating material forms part of one of said sections, and wherein the other section contains electronic circuitry which is electrically connected to said antenna; and wherein said other section includes a second antenna which is likewise electrically connected to said electronic circuitry; and wherein both antennae are connected to said electronic circuitry via the same node; and wherein said antennae are electrically mismatched as seen by the electronic circuitry; and wherein a mechanical tuning element is attached for movement with one of said sections of the housing, said tuning element being positioned such that as the two sections are moved with respect to one another, the element detunes one of the antennae, but not the other, thus introducing an electrical mismatch between them.

2. A portable electronic apparatus having a housing made, at least in part, in insulating material, and incorporating an antenna comprising an active element and a ground plane, said active element comprising a length of conductive material disposed parallel to the ground plane and fed from one end; wherein the antenna is mounted on a sheet of insulating material forming part of said housing, and comprises a first rectangular sheet of conductive material forming said ground plane, and a second, elongate, rectangular sheet of conductive material forming said active element; and wherein the housing is in two sections which are movable with respect to one another, and wherein said sheet of insulating material forms part of one of said sections, and wherein the other section contains electronic circuitry which is electrically connected to said antenna; and wherein said other section includes a second antenna which is likewise electrically connected to said electronic circuitry; and wherein both antennae are connected to said electronic circuitry via the same node; and wherein, in a first relative position of said sections, said antenna is spaced from said electronic circuitry, and is well matched electrically to said electronic circuitry in this position and wherein, in a second relative position of said sections, said antenna is relatively closer to said electronic circuitry such that its proximity to said electronic circuitry detunes the antenna and causes it to be electrically mismatched to said electronic circuitry.

3. A portable electronic apparatus as claimed in either one of claims 1 or 2, wherein capacitor means are connected between the active element and the ground plane in order to capacitively match the antenna.

4. A portable electronic apparatus as claimed in either one of claims 1 or 2, wherein said two sections are hingedly connected together.

5. A portable electronic apparatus as claimed in either one of claims 1 or 2, wherein said second antennae comprises another active element and another ground plane, said another active element comprising a length of conductive material disposed parallel to said another ground plane and fed from one end.

6. A portable electronic apparatus as claimed in claim 5, wherein said second antenna is mounted on a sheet of insulating material and comprises a first rectangular sheet of conductive material forming said another ground plane and a second, elongate, rectangular sheet of conductive material forming said another active element.

7. A portable electronic apparatus as claimed in claim 6, wherein said sheet of conductive material forming said another ground plane of the second antenna further forms a ground plane for said electronic circuitry.

8. A portable electronic apparatus as claimed in claim 6 including an inductance tuning means placed in series with said another active element.

9. A portable electronic apparatus as claimed in claim 1; wherein, in a first relative position of said sections, said antenna is spaced from said electronic circuitry, and is well matched electrically to said electronic circuitry in this position and wherein, in a second relative position of said sections, said antenna is relatively closer to said electronic circuitry such that its proximity to said electronic circuitry detunes the antenna and causes it to be electrically mismatched to said electronic circuitry.

10. A portable electronic apparatus as claimed in either one of claims 9 or 2, wherein said antenna is mismatched when said sections are in said second relative position so as to exhibit an open circuit to said electronic circuitry.

11. A portable electronic apparatus as claimed in either one of claims 1 or 2, wherein the characteristic impedance of one of said antennae is significantly higher than that of the other.

12. A portable electronic apparatus as claimed in either one of claims 1 or 2, in the form of a handset for a cordless telephone apparatus, wherein said other of said sections comprises a main housing section incorporating transceiver circuitry and a telephone keypad, and wherein said one of said sections forms a flap pivotally mounted with respect to the main housing section, and is operable to cover the keypad when the handset is not in use.

* * * * *